United States Patent
Choi et al.

(10) Patent No.: US 11,807,124 B2
(45) Date of Patent: Nov. 7, 2023

(54) ELECTRIC VEHICLE CHARGER CONTROL SYSTEM LINKED WITH ENERGY MANAGEMENT SYSTEM

(71) Applicant: Charzin Co.,Ltd, Seongnam-si (KR)

(72) Inventors: Young Suk Choi, Seoul (KR); Hyun Jun Kim, Seoul (KR)

(73) Assignee: CHARZIN CO., LTD, Seongnam-si (KR)

( * ) Notice: Subject to any disclaimer, the term of this patent is extended or adjusted under 35 U.S.C. 154(b) by 406 days.

(21) Appl. No.: 16/952,897

(22) Filed: Nov. 19, 2020

(65) Prior Publication Data

US 2022/0153162 A1 May 19, 2022

(51) Int. Cl.
| | |
|---|---|
| *H02J 7/00* | (2006.01) |
| *B60L 53/63* | (2019.01) |
| *B60L 53/30* | (2019.01) |
| *G06Q 50/06* | (2012.01) |
| *G06Q 10/02* | (2012.01) |
| *B60L 53/67* | (2019.01) |

(52) U.S. Cl.
CPC ............ *B60L 53/63* (2019.02); *B60L 53/305* (2019.02); *B60L 53/67* (2019.02); *G06Q 10/02* (2013.01); *G06Q 50/06* (2013.01)

(58) Field of Classification Search
USPC ..................... 320/106, 107, 108, 109, 110
See application file for complete search history.

(56) References Cited

U.S. PATENT DOCUMENTS

| | | | | |
|---|---|---|---|---|
| 2013/0257146 A1* | 10/2013 | Nojima | ............... | B60L 53/22 307/9.1 |
| 2014/0028254 A1* | 1/2014 | Shane | ................ | B60L 58/12 320/109 |
| 2015/0346697 A1* | 12/2015 | Mailloux | ............ | B60L 53/31 307/31 |
| 2019/0202315 A1* | 7/2019 | Wilding | ........... | G01C 21/3407 |
| 2021/0242704 A1* | 8/2021 | Lim | ..................... | B60L 53/62 |

FOREIGN PATENT DOCUMENTS

| | | | | |
|---|---|---|---|---|
| CN | 102055217 B | * | 9/2012 | ......... B60L 11/1844 |
| JP | 2013-188031 A | | 9/2013 | |
| KR | 10-2013-0025201 A | | 3/2013 | |
| KR | 102041839 B1 | * | 11/2019 | |

* cited by examiner

*Primary Examiner* — Brian Ngo
(74) *Attorney, Agent, or Firm* — Bridgeway IP Law Group, PLLC; Sang Ho Lee; Hyun Woo Shin

(57) ABSTRACT

An exemplary embodiment of the present disclosure is an electric vehicle charger control system linked with an EMS including a communication unit which receives allowable power information which is information about available power to charge an electric vehicle from an energy management system (EMS); a management unit which generates charger setting information which is information about charging setting in consideration of at least one of a priority for every charger, a maximum/minimum charging power amount for every charger, a current charging power amount for every charger, and reservation state information of the user, for the plurality of electric vehicle chargers, using the allowable power information; and a control unit which controls the plurality of electric vehicle chargers according to the charger setting information for every charger.

10 Claims, 3 Drawing Sheets

ELECTRIC VEHICLE CHARGER CONTROL SYSTEM LINKED WITH ENERGY MANAGEMENT SYSTEM

BACKGROUND

Field

The present disclosure relates to an electric vehicle charger control system linked with an energy management system (EMS).

Description of the Related Art

As automobile makers begin to sell electric vehicles in earnest, sales of the electric vehicles are rapidly increasing. It has been researched that in the first half of 2020, about 950,000 electric vehicles were sold worldwide and it is expected to sell 8.5 million electric vehicles in 2025, 26 million electric vehicles in 2030, and 54 million electric vehicles in 2040.

Along with this, charging stations for charging electric vehicles are also rapidly increasing and the Ministry of Environment announced that there were 17,997 chargers (12,061 slow chargers and 5,936 fast chargers) as of the end of 2019 and an infrastructure will be built with a goal of completing the installation of 15,000 fast chargers by 2025.

However, the electric vehicle charging stations consume a lot of power in the unit of tens to hundreds of kW to charge the vehicles, which may cause fatal problems such as shut-down of electric equipment of facilities (buildings or complexes) where the electric vehicle charging stations are installed.

Accordingly, there is a necessity for an electric vehicle charger control system which is linked with an energy management system (EMS) of the facility to enable the management of the energy of the facility while controlling a charging amount of the electric vehicle in real time.

SUMMARY

An object of an exemplary embodiment of the present disclosure is to provide an electric vehicle charger control system which is linked with an energy management system (EMS) to efficiently manage the electric vehicle charger.

In order to achieve the above-described objects, according to an aspect of the present disclosure, an electric vehicle charger control system linked with an EMS includes a communication unit which receives allowable power information which is information about available power to charge an electric vehicle from an energy management system (EMS); a management unit which generates charger setting information which is information about charging setting in consideration of at least one of a priority for every charger, a maximum charging power amount for every charger, a current charging power amount for every charger, and reservation state information of the user, for the plurality of electric vehicle chargers, using the allowable power information; and a control unit which controls the plurality of electric vehicle chargers according to the charger setting information for every charger.

Desirably, the communication unit receives a charging state request requesting information about a charging state of the plurality of electric vehicle chargers from the EMS and transmits charging power information which is information about a charging power of the plurality of electric vehicle chargers to the EMS in response to the charging state request.

Desirably, the communication unit receives a history information request requesting information about a history of controlling each of the plurality of electric vehicle chargers from the EMS and transmit control history information which is information about a history of controlling the plurality of electric vehicle chargers to the EMS in response to the history information request.

Desirably, the control unit controls the plurality of electric vehicle chargers according to the charger setting information to change an output power, stop charging, or stop operation of the charger for each of the chargers.

Desirably, the communication unit receives reservation information which is information about usage reservation of an electric vehicle charger from a user and the management unit stores the reservation information and information about a reserved charger which is one of the plurality of electric vehicle chargers corresponding to the reservation information in a user reservation database.

In order to achieve the above-described objects, according to another aspect of the present disclosure, a method of controlling an electric vehicle charger by an electric vehicle charger control system linked with an EMS includes receiving allowable power information which is information about an available power to charge an electric vehicle from the EMS; generating charger setting information which is information about charging setting in consideration of at least one of a priority for every charger, a maximum charging power amount for every charger, a current charging power amount for every charger, and reservation state information of the user, for the plurality of electric vehicle chargers, using the allowable power information; and controlling the plurality of electric vehicle chargers according to the charger setting information for every charger.

Desirably, the method may further include receiving a charging state request requesting information about a charging state of the plurality of electric vehicle chargers from the EMS; and transmitting charging power information which is information about a charging power of the plurality of electric vehicle chargers to the EMS in response to the charging state request.

Desirably, the method may further include receiving a history information request requesting information about a history of controlling each of the plurality of electric vehicle chargers from the EMS; and transmitting control history information which is information about a history of controlling the plurality of electric vehicle chargers to the EMS in response to the history information request.

Desirably, in the controlling according to the charger setting information, when the plurality of electric vehicle chargers is controlled according to the charger setting information, each charger is controlled to change an output power, stop charging, or stop operation of the charger for each of the chargers.

Desirably, the method may further include receiving reservation information which is information about usage reservation of an electric vehicle charger, from a user; and storing the reservation information and information about a reserved charger which is one of the plurality of electric vehicle chargers corresponding to the reservation information in a user reservation database.

According to the exemplary embodiment of the present disclosure, the system is linked with an energy management system (EMS) to manage the electric vehicle charger, thereby more smoothly managing the energy in a facility where the EMS is installed.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figure 1:
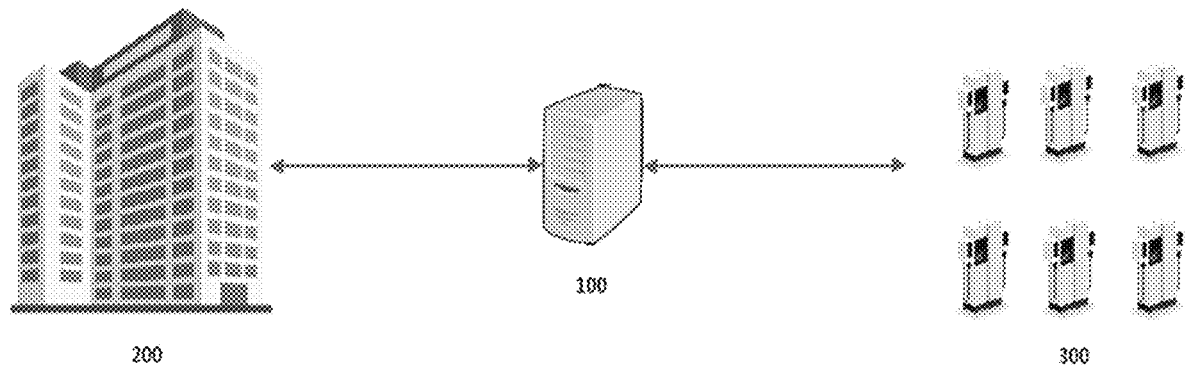
FIG. 1 is a view for explaining a relationship of an electric vehicle charger control system according to an exemplary embodiment of the present disclosure, an EMS, and an electric vehicle charger.

Those skilled in the art may make various modifications to the present invention and the present invention may have various embodiments thereof, and thus specific embodiments will be described in detail with reference to the drawings. However, it should be understood that the present disclosure is not limited to the specific embodiments, but includes all changes, equivalents, or alternatives which are included in the spirit and technical scope of the present invention. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present invention, a first component may be referred to as a second component, and similarly, a second component may be referred to as a first component. A term of and/or includes a combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

Terms used in the present application are used only to describe a specific exemplary embodiment, but are not intended to limit the present invention. A singular form may include a plural form if there is no clearly opposite meaning in the context. In the present application, it should be understood that term "include" or "have" indicates that a feature, a number, a step, an operation, a component, a part or the combination thoseof described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

In the specification and the claim, unless explicitly described to the contrary, the word "comprise" and variations such as "comprises" or "comprising", will be understood to imply the inclusion of stated elements but not the exclusion of any other elements.

Hereinafter, the present disclosure will be described with reference to the accompanying drawings.

FIG. 1 is a view for explaining a relationship of an electric vehicle charger control system according to an exemplary embodiment of the present disclosure, an EMS, and an electric vehicle charger.

The electric vehicle charger control system 100 is linked with an EMS 200 to control a charging amount of the electric vehicle charger in an optimal condition, which enables the energy management of the facility.

The EMS 200 is a system which collects various information about a facility such as buildings and complexes and analyzes data to provide an optimal environment to the facility and efficiently manage the energy. That is, the EMS 200 is a control, management, and administration system which enables a facility manager to use the energy in a reasonable manner using a computer and efficiently maintains and preserves a pleasant and functional environment.

Finally, the electric vehicle charger 300 is a device connected to an electric vehicle to supply power to charge the electric vehicle, in accordance with the control of the electric vehicle charger control system 100. In this case, the plurality of electric vehicle chargers 300 may be various types of chargers such as a fast charger, a slow charger, a low speed charger, and a charging concentric plug.

Figure 2:
FIG. 2 is a block diagram for explaining an electric vehicle charger control system linked with an EMS according to an exemplary embodiment of the present disclosure.

FIG. 2 is a block diagram for explaining an electric vehicle charger control system linked with an EMS according to an exemplary embodiment of the present disclosure.

Figure 3:
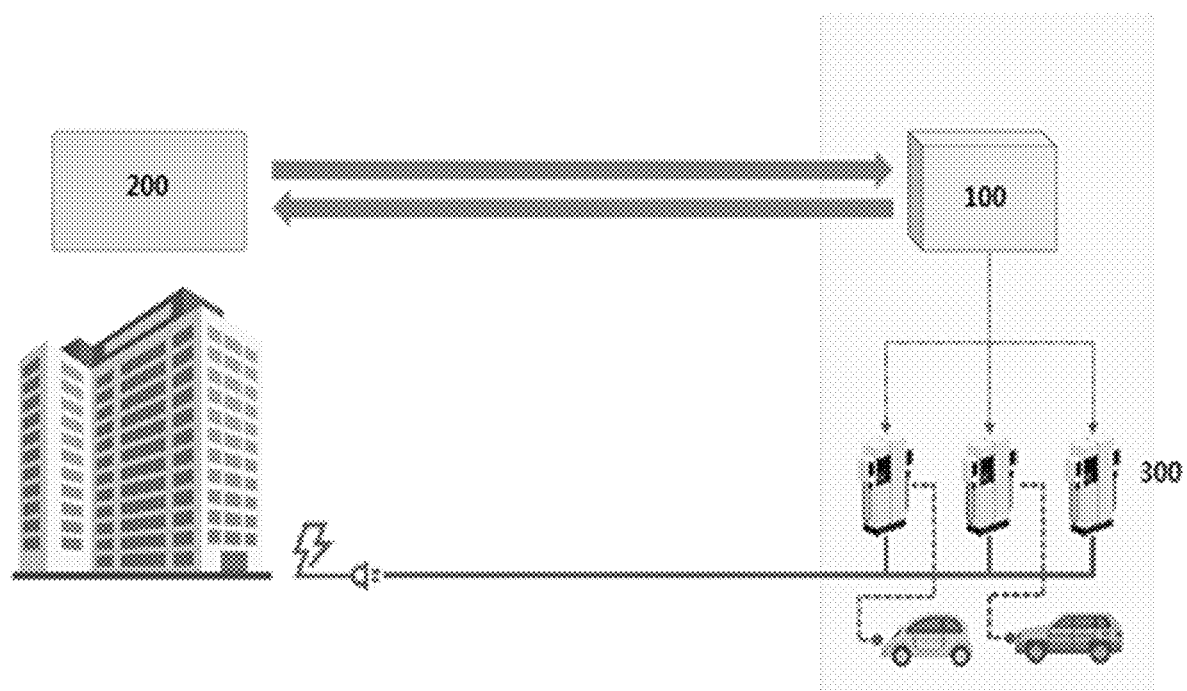
FIG. 3 is a view for explaining a relationship of an electric vehicle charger control system according to another exemplary embodiment of the present disclosure, an EMS, and an electric vehicle charger.

Referring to FIG. 2, the electric vehicle charger control system 100 linked with an EMS according to an exemplary embodiment of the present disclosure includes a communication unit 110, a management unit 120, and a control unit 130. Further, referring to FIG. 3, the relationship of the electric vehicle charger control system 100 linked with an EMS, the EMS 200, and a plurality of electric vehicle chargers 300 is illustrated.

In the meantime, the electric vehicle charger control system 100 linked with an EMS may be loaded in a computing device such as a server computer, a desktop PC, a notebook PC, a tablet PC, and a smart phone.

The communication unit 110 receives allowable power information which is information about power available to charge the electric vehicle, from the EMS 200.

Here, the allowable power information may refer to a maximum power available for the electric vehicle charger control system 100 to charge the electric vehicle by means of the plurality of electric vehicle chargers 300. That is, the electric vehicle charger control system 100 needs to manage a total of the charging amounts of the plurality of electric vehicle chargers 300 so as not to simultaneously use a maximum power or more to charge the electric vehicle.

In the meantime, the communication unit 110 may receive the allowable power information from the EMS 200 in various cases. That is, the communication unit 110 may receive the allowable power information from the EMS 200 periodically in a specified season, month, day, and day of the week, and at a specified time.

Further, when a usage amount of the electric energy of the EMS 200 is suddenly changed or is expected to be suddenly changed so that there is a need to change the available power to charge the electric vehicle, the communication unit 110 receives allowable power information from the EMS 200.

The management unit 120 generates charger setting information which is information about charging setting in consideration of at least one of a priority for every charger, a maximum charging power amount for every charger, a current charging power amount for every charger, and reservation state information of the user, for the plurality of electric vehicle chargers 300, using the allowable power information.

That is, the management unit 120 generates the charger setting information for each of the plurality of electric vehicle chargers 300 in consideration of at least one of a priority for every charger, a maximum charging power amount for every charger, a current charging power amount for every charger, and reservation state information of the user, for the plurality of electric vehicle chargers 300, within an available power range included in the allowable power information.

In other words, when the allowable power information is insufficient to operate all the plurality of electric vehicle chargers 300 with the maximum charging power amount, the management unit 120 may determine whether each of the plurality of electric vehicle chargers 300 is operable and an allowable charging power amount in consideration of at least one of a priority for every charger, a maximum charging power amount for every charger, a current charging power amount for every charger, and reservation state information of the user.

In this case, the charger setting information may include information about the charging setting such as whether to operate or the allowable charging power amount.

In the meantime, when the allowable power information is insufficient to operate all the plurality of electric vehicle chargers 300 with the maximum charging power amount, the management unit 120 may consider following various information to generate the charger setting information. In other words, the management unit 120 may generate the charger setting information using an algorithm configured to reflect various information and the setting of the manager.

That is, the management unit 120 may generate charger setting information to operate as many chargers with a higher priority as possible in consideration of a priority for every charger set by reflecting a position of the charger in the facility and a usage frequency according to the setting.

Further, the management unit 120 may generate charger setting information so as to operate as many fast chargers with a high maximum charging power amount as possible or operate as many slow chargers with a low minimum charging power amount as possible according to the setting.

Further, the management unit 120 may generate charger setting information so as to operate chargers having a current charging power amount which is higher than 0 (that is, which is being charged) as many as possible according to the setting.

Further, the management unit 120 may generate charger setting information so as to operate chargers with reservations of the users as many as possible according to the setting.

At this time, in order to manage a total charging power amount, the management unit 120 limits the allowable charging power amount of each charger to a specific value smaller than the maximum charging power amount to generate charger setting information. That is, the management unit 120 may set the allowable charging power amount of the individual charger to be lower than the maximum charging power amount to operate chargers as many as possible according to the setting.

Finally, the control unit 130 controls the plurality of electric vehicle chargers 300 according to charger setting information for every charger.

That is, the control unit 130 may individually control the plurality of electric vehicle chargers 300 according to the charger setting information.

For example, for ten chargers which configure the plurality of electric vehicle chargers 300, the control unit 130 may operate five slow chargers to charge with a maximum charging power amount and stop the operation of five fast chargers, thereby individually controlling the chargers.

At this time, when the communication unit 110 receives allowable power information from the EMS 200 and the management unit 120 generates charger setting information, the control unit 130 may control the charger setting information to be applied to the plurality of electric vehicle chargers 300 in real time. That is, the control unit 130 may apply the charger setting information to the plurality of electric vehicle chargers 300 in real time without cutting off the power supply of the plurality of electric vehicle chargers 300 or stopping the charging which is currently in progress.

According to another exemplary embodiment, the communication unit 110 receives a charging state request requesting information about a charging state of the plurality of electric vehicle chargers 300 from the EMS 200 and transmit charging power information which is information about the charging power of the plurality of electric vehicle chargers 300 to the EMS 200 in response to the charging state request.

For example, when information about the charging states (that is, a total charging power amount) of the plurality of electric vehicle chargers 300 is necessary, the EMS 200 transmits the charging state request to the communication unit 110 and receives charging power information which is information about the charging power (that is, a total charging power amount) of the plurality of electric vehicle chargers 300 from the communication unit 110 again.

To this end, the management unit 120 receives information about the charging state of the individual chargers from the plurality of electric vehicle chargers 300 to generate charging power information. The communication unit 110 may transmit the charging power information to the EMS 200.

In the meantime, the EMS 200 secures big data for a charging power of the plurality of electric vehicle chargers 300 to use the big data to be linked with the electric vehicle charger control system 100. For example, the EMS 200 may use the big data for the charging power to derive appropriate allowable power information.

According to another exemplary embodiment, the communication unit 110 receives a history information request requesting information about a history of controlling the plurality of electric vehicle chargers 300 from the EMS 200 and transmits control history information which is information about the history of controlling the plurality of electric vehicle chargers 300 to the EMS 200 in response to the history information request.

For example, when information about the history of controlling each of the plurality of electric vehicle chargers 300 is necessary, the EMS 200 transmits the history information request to the communication unit 110 and receives the history information request which is information about the history of controlling the plurality of electric vehicle chargers 300 from the communication unit 110 again.

By doing this, the EMS 200 secures big data for the history of controlling the plurality of electric vehicle chargers 300 to use the big data to be linked with the electric vehicle charger control system 100.

According to still another exemplary embodiment, when the control unit 130 controls the plurality of electric vehicle chargers 300 according to the charger setting information, the control unit 130 may control the individual chargers to change an output power, stop the charging, or stop the operation of the charger.

That is, when the control unit 130 controls the plurality of electric vehicle chargers 300, the control unit 130 may control the chargers to increase or decrease the output power of the chargers, immediately stop charging which is in progress, or stop the operation.

For example, when an available power to charge included in the allowable power information is increased, the control unit 130 may increase the output power (an allowable charging power amount) of the charger. Further, when an available power to charge included in the allowable power information is decreased, the control unit 130 may decrease the output power (an allowable charging power amount) of the charger or stop the charging or stop the operation if necessary.

According to another exemplary embodiment, the communication unit 110 receives reservation information which is information about usage reservation of the electric vehicle charger from the user and the management unit 120 may store the reservation information and information about a reserved charger which is one of the plurality of electric vehicle chargers 300 corresponding to the reservation information in a user reservation database.

For example, the communication unit 110 may receive the reservation information from a smart phone application of the user or a web browser of a PC. At this time, the reservation information may include information such as a type (a connector type or a charging speed) of the charger, a position of the charger, a charging time, and a charging power amount. In the meantime, the position of the charger may be set by the management unit 120 according to the reservation information.

At this time, the management unit 120 may store reservation information and information about a reserved charger in the user reservation database. Further, the management unit 120 may transmit reservation-related information (a reservation number, a reservation time, a location of the charger, a usage time, a charging power amount, and a charging cost) to the user through a smart phone application or a web browser of a PC.

Thereafter, when the user visits the reserved charger, the user starts and ends the charging by inputting a reservation number to the charger or using the smart phone application. At this time, the charging cost may be paid with a pre-registered credit card or pre-paid points.

According to still another exemplary embodiment, the electric vehicle charger control system 100 linked with an EMS according to an exemplary embodiment of the present disclosure is designed in a general-purpose communication method to secure connectivity with various types of EMS and electric vehicle chargers.

For example, the electric vehicle charger control system 100 applies a communication scheme by REST API which is one of software architectures for a distributed hypermedia system to be easily linked with various EMS and easily respond to additional functions.

Further, the electric vehicle charger control system 100 provides a charger control protocol for power control so that electric vehicle charger manufacturers may use the protocol only by applying the protocol as software.

Figure 4:
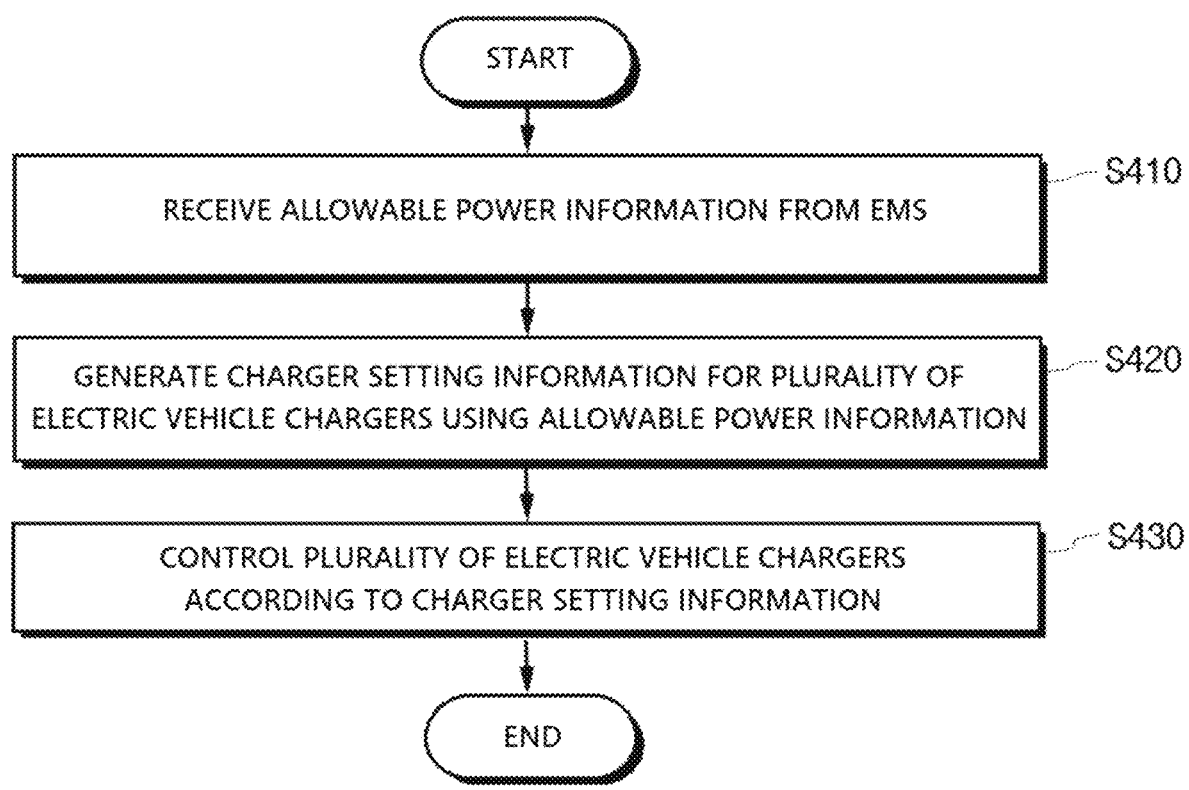
FIG. 4 is a flowchart for explaining a method of controlling an electric vehicle charger linked with an EMS according to an exemplary embodiment of the present disclosure.

FIG. 4 is a flowchart for explaining an electric vehicle charger control method linked with an EMS according to an exemplary embodiment of the present disclosure.

In step S410, the electric vehicle charger control device 100 receives allowable power information which is information about available power to charge the electric vehicle from the EMS 200.

In step S420, the electric vehicle charger control device 100 generates charger setting information which is information about charging setting in consideration of at least one of a priority for every charger, a maximum charging power amount for every charger, a current charging power amount for every charger, and reservation state information of the user, for the plurality of electric vehicle chargers 300, using the allowable power information.

In step S430, the electric vehicle charger control device 100 controls the plurality of electric vehicle chargers 300 according to charger setting information for every charger.

According to another exemplary embodiment, the electric vehicle charger control device 100 receives a charging state request requesting information about a charging state of the plurality of electric vehicle chargers 300 from the EMS 200 and transmits charging power information which is information about the charging power of the plurality of electric vehicle chargers 300 to the EMS 200 in response to the charging state request.

According to another exemplary embodiment, the electric vehicle charger control device 100 receives a history information request requesting information about a history of controlling each of the plurality of electric vehicle chargers 300 from the EMS 200 and transmits control history information which is information about the history of controlling the plurality of electric vehicle chargers 300 to the EMS 200 in response to the history information request.

According to still another exemplary embodiment, when the electric vehicle charger control device 100 controls the plurality of electric vehicle chargers 300 according to the charger setting information, the electric vehicle charger control device 100 may control the individual chargers to change an output power, stop the charging, or stop the operation of the charger.

According to still another exemplary embodiment, the electric vehicle charger control device 100 receives reservation information which is information about usage reservation of the electric vehicle charger from the user and store the reservation information and information about a reserved charger which is one of the plurality of electric vehicle chargers 300 corresponding to the reservation information in a user reservation database.

It will be appreciated that various exemplary embodiments of the present disclosure have been described herein for purposes of illustration, and that various modifications, changes, and substitutions may be made by those skilled in the art without departing from the scope and spirit of the present disclosure. Accordingly, the exemplary embodiments disclosed herein are intended to not limit but describe the technical spirit of the present disclosure and the scope of the technical spirit of the present disclosure is not restricted by the exemplary embodiments. The protective scope of the present disclosure should be construed based on the following claims, and all the technical concepts in the equivalent scope thereof should be construed as falling within the scope of the present disclosure.

What is claimed is:

1. An electric vehicle charger control system linked with an energy management system (EMS), comprising:
   a communication unit which receives allowable power information which is information about available power to charge an electric vehicle from the EMS;
   a management unit which generates charger setting information for a plurality of electric vehicle chargers, wherein the charger setting information is information about charging setting in consideration of at least one of a priority for each charger, a maximum charging power amount for each charger, a current charging power amount for each charger, and reservation state information of a user, using the allowable power information; and
   a control unit which controls the plurality of electric vehicle chargers according to the charger setting information for each charger,
   wherein the priority for each charger is set by reflecting a position of the charger in a facility and a usage frequency, and
   wherein the control unit limits allowable charging power amount of each charger to a specific value smaller than the maximum charging power amount to maximize operation of the electric vehicle chargers with as many reservations of users as possible.

2. The electric vehicle charger control system according to claim 1, wherein the communication unit receives a charging state request requesting information about a charging state of the plurality of electric vehicle chargers from the EMS and transmits charging power information which is information about a charging power of the plurality of electric vehicle chargers to the EMS in response to the charging state request.

3. The electric vehicle charger control system according to claim 1, wherein the communication unit receives a history information request requesting information about a history of controlling each of the plurality of electric vehicle chargers from the EMS and transmits control history information which is information about a history of controlling the plurality of electric vehicle chargers to the EMS in response to the history information request.

4. The electric vehicle charger control system according to claim 1, wherein the control unit controls the plurality of electric vehicle chargers according to the charger setting information to change an output power, stop charging, or stop operation of the charger for each of the chargers.

5. The electric vehicle charger control system according to claim 1, wherein the communication unit receives reservation information which is information about usage reservation of an electric vehicle charger from flail the user and the management unit stores the reservation information and information about a reserved charger which is one of the plurality of electric vehicle chargers corresponding to the reservation information in a user reservation database.

6. A method of controlling an electric vehicle charger by an electric vehicle charger control system linked with an energy management system (EMS), the method comprising:
   receiving allowable power information which is information about an available power to charge an electric vehicle from the EMS;
   generating charger setting information for a plurality of electric vehicle charges, wherein the charger setting information is information about charging setting in consideration of at least one of a priority for each charger, a maximum charging power amount for each charger, a current charging power amount for each charger, and reservation state information of a user, using the allowable power information; and
   controlling the plurality of electric vehicle chargers according to the charger setting information for each charger,
   wherein the priority for each charger is set by reflecting a position of the charger in a facility and a usage frequency, and
   wherein generating the charger setting information further comprises limiting allowable charging power amount of each charger to a specific value smaller than the maximum charging power amount to maximize operation of the electric vehicle chargers with as many reservations of users as possible.

7. The method according to claim 6, further comprising:
   receiving a charging state request requesting information about a charging state of the plurality of electric vehicle chargers from the EMS; and
   transmitting charging power information which is information about a charging power of the plurality of electric vehicle chargers to the EMS in response to the charging state request.

8. The method according to claim 6, further comprising:
   receiving a history information request requesting information about a history of controlling each of the plurality of electric vehicle chargers from the EMS; and
   transmitting control history information which is information about a history of controlling the plurality of electric vehicle chargers to the EMS in response to the history information request.

9. The method according to claim 6, wherein in the controlling according to the charger setting information, when the plurality of electric vehicle chargers is controlled according to the charger setting information, each charger is controlled to change an output power, stop charging, or stop operation of the charger for each of the chargers.

10. The method according to claim 6, further comprising:
    receiving reservation information which is information about usage reservation of an electric vehicle charger, from flail the user; and
    storing the reservation information and information about a reserved charger which is one of the plurality of electric vehicle chargers corresponding to the reservation information in a user reservation database.

* * * * *